United States Patent [19]
Howard

[11] 4,251,941
[45] Feb. 24, 1981

[54] SELF-THREADING BOBBER

[76] Inventor: Durrell U. Howard, 306 Krameria Dr., San Antonio, Tex. 78213

[21] Appl. No.: 61,105

[22] Filed: Jul. 26, 1979

[51] Int. Cl.³ ............................................. A01K 93/00
[52] U.S. Cl. .................................. 43/43.11; 43/44.91
[58] Field of Search .................... 43/43.11, 44.9, 44.91

[56] References Cited

U.S. PATENT DOCUMENTS

| | | | |
|---|---|---|---|
| 1,973,028 | 9/1934 | Thomas | 43/43.11 |
| 3,141,256 | 7/1964 | McBriar | 43/43.11 |
| 3,169,339 | 2/1965 | Ekstrand | 43/43.11 |
| 3,340,644 | 9/1967 | Lintz | 43/43.11 |
| 3,364,613 | 1/1968 | Sewell | 43/43.11 |
| 3,673,729 | 7/1972 | Lintz | 43/43.11 |
| 3,800,460 | 4/1974 | Holder | 43/44.91 |

*Primary Examiner*—Nicholas P. Godici

[57] ABSTRACT

A self-threading casting bobber for automatically letting out a predetermined length of fishing line to position a sinker and hook attached to the line at a predetermined depth beneath the bobber and including a lock mechanism selectively actuable to fixedly clamp the fishing line in place within the bobber to allow the line to be wrapped on a rotatable spool mounted within the bobber.

22 Claims, 10 Drawing Figures

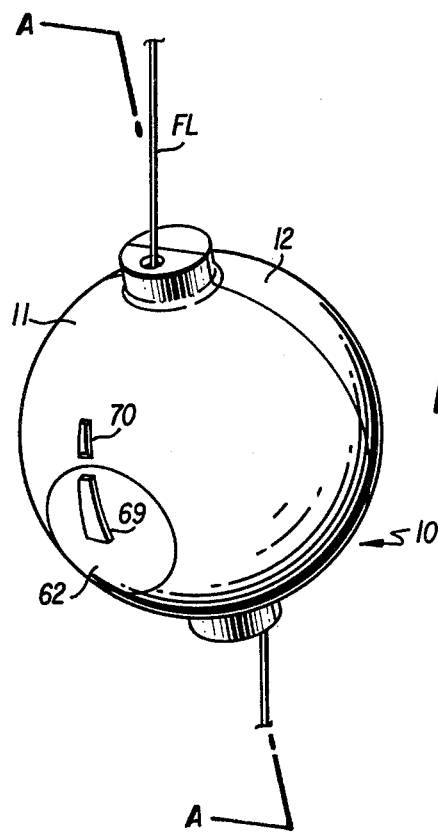
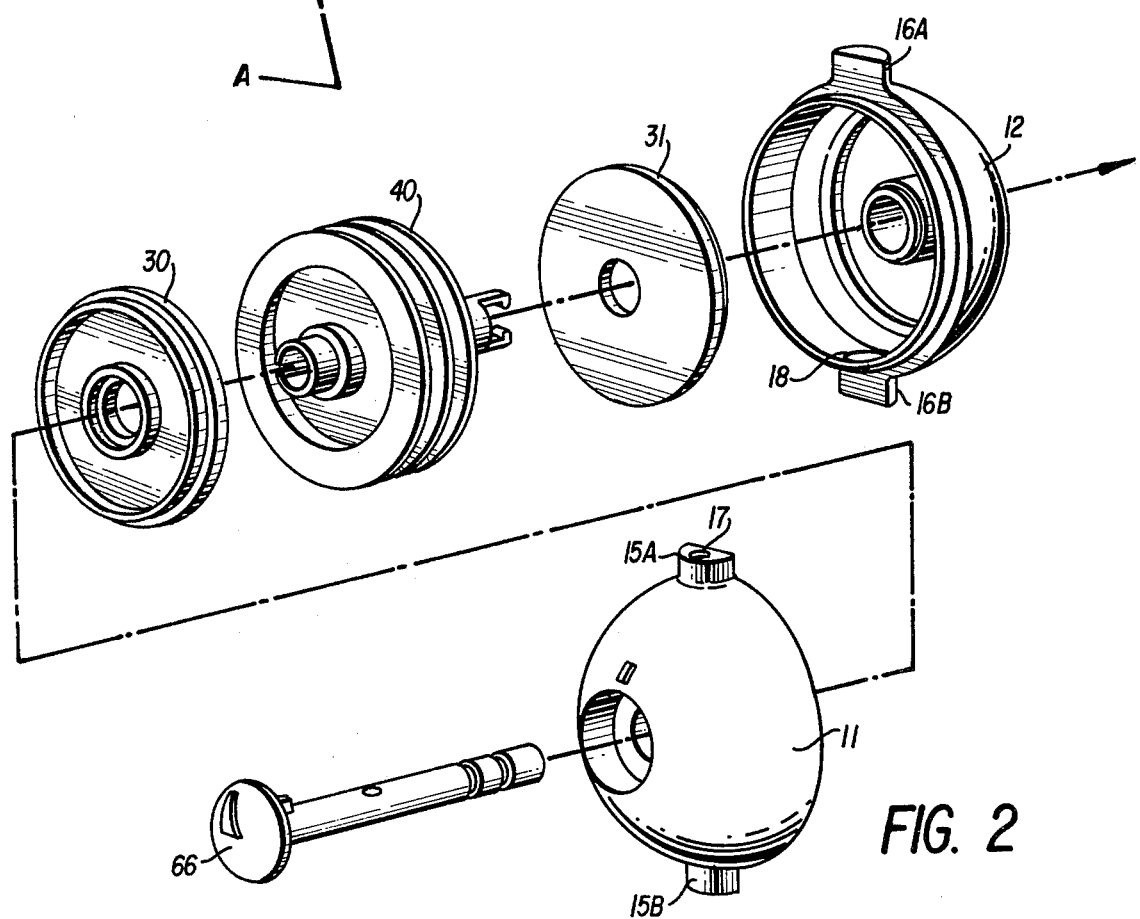
FIG. 1
FIG. 2

SELF-THREADING BOBBER

DESCRIPTION

Technical Field

This invention relates to buoyant casting bobbers or floats of the type used in both bobber and cast fishing to mark and regulate the position of a fishing line having a sinker and baited hook attached to one end. More particularly, the invention is directed to a compact, self-threading bobber capable of automatically positioning a baited hook at a predetermined depth beneath the bobber.

BACKGROUND ART

The art of cast fishing has evolved over countless centuries as both a primary source of obtaining food and a source of recreational pleasure. One of the inherent problems facing all cast fishermen is the inability to accurately locate and, more importantly, regulate the position of a baited hook and sinker once cast into the water. As a consequence, the baited hook may snag on the bottom of rivers, lakes and even the ocean itself. In addition, because the sinker and hook generally strike and continue through the water at an angle to the surface, it is often difficult to determine precisely where the hook should strike the water to ensure the proper final position of the hook.

In an effort to overcome these problems, the self-winding bobber or float assembly was devised and perfected. Essentially, a rotatable spool-like structure was mounted in a hollow bobber which was made inherently buoyant. A preselected length of fishing line was inserted into the float and wound on the spool, with a portion of the fishing line extending from the bobber and having a sinker and hook attached thereto. The bobber was then either dropped directly into the water as when bobber fishing from a dock or an attempt was made to cast the bobber from a fishing rod held by the fisherman. During such a casting operation, the bobber, sinker and hook were cast as a unit, with the weight of the sinker functioning to unwind the fishing line from the spool following impact of the bobber against the water.

However, casting known bobbers proved to be unsatisfactory, in that the hook and sinker would move about the bobber, creating a centrifugal force which tended to tangle the fishing line and destroy the bait attached to the hook. Furthermore, it was difficult to cast the bobber any significant distance and still have the hook and sinker drop to a preselected depth. As a result, known self-winding bobbers have been generally unsatisfactory in bobber fishing and, more particularly, in cast fishing.

An example of a typical, self-winding bobber assembly is suggested in U.S. Pat. No. 3,364,613 issued Jan. 23, 1968 to Sewell, wherein a hollow bobber is formed from a pair of shell sections joined together with a rotatable spool assembly mounted therein. The Sewell device has proven less than completely satisfactory for a variety of reasons. First, Sewell suggests a relatively complex and cumbersome structure, wherein the shell sections must be completely separated from one another in order to thread the fishing line onto the spool. Second, Sewell suggests that the fishing line enter and exit the bobber through apertures which straddle the shell sections. This allows one or both of the shell sections to be accidently dropped upon separation of the bobber, an event of distinct possibility as when handled on a rocking boat or while standing in the middle of a swiftly flowing stream. Third, the varying structure of the spool assembly allows the fishing line to easily jump the dividing plate and become entangled. Furthermore, the relatively small diameter of the spool relative to the size of the shell sections makes it difficult for the fishing line to generate sufficient leverage to automatically initiate rotation of the spool in either direction. In addition, it has been observed that fishing line tightly wrapped about a small diameter spool tends to act like a coil spring, making it difficult for the weight of the sinker to initiate automatic unwinding of the fishing line as required.

In an effort to overcome the types of problems facing Sewell, U.S. Pat. No. 3,141,256 issued July 21, 1964 to McBriar suggests that the spool member have a relatively large diameter as compared to Sewell, with the dividing plate extending almost into contact with the shell walls. While McBriar appears to suggest a partial solution to the problems of fishing line entanglement and insufficient leverage, it is clear that McBriar also requires separation of the shell sections to initiate threading of the fishing line onto the spool assembly. Furthermore, McBriar, like Sewell, also forms entry and exit apertures which straddle the shell sections, leading to the same possible loss of one or both shell sections as facing Sewell.

A third approach to the problem is demonstrated in U.S. Pat. No. 3,169,339 issued Feb. 16, 1965 to Ekstrand, which suggests a shell structure which need not be separated to initiate threading of the fishing line onto a pair of separate spool assemblies. However, Ekstrand suggests that a costly and elaborate clutch mechanism be employed for selectively engaging the two spools to one another for joint rotation. In addition, the relatively small size of the spools as compared to the distance between the spools and the inner shell, creates the possibility of the fishing line jumping between spools and becoming entangled as a result. Finally, Ekstrand also faces the same problem as Sewell, namely, that the fishing line cannot develop sufficient leverage to initiate self-winding of the spools in either direction as required.

An object of the present invention is to provide a self-winding bobber assembly, wherein a spool assembly is constructed of sufficient size to ensure that a fishing line wrapped about the spool will develop sufficient leverage to initiate self-winding of the spool in either direction.

A further object of the present invention is to provide a self-threading casting bobber, wherein a fishing line can be wound onto a spool mounted within the bobber without separation of a pair of surrounding shell sections.

A further object of the present invention is to provide a casting bobber, wherein entry and exit apertures are formed in separate shell sections to prevent loss of either shell section of the bobber once threaded.

A yet further object of the present invention is to provide a bobber, wherein a unitary spool assembly is rotatably positioned within a pair of attached shell sections, with the spool assembly including a dividing plate of sufficient size so as to positively prevent the fishing line from jumping between opposite sides of the spool assembly.

Another object of the present invention is to provide a bobber assembly, wherein a pair of buoyancy disks are mounted in the shell sections and are formed with flange portions to allow ultrasonic welding between the buoyancy disks and the surrounding shell sections.

Another object of the present invention is to provide a self-threading bobber, wherein a locking shaft extends through the pair of attached shell sections, with the locking shaft being selectively positionable to fixedly attach the fishing line to the bobber assembly.

DISCLOSURE OF THE INVENTION

In order to achieve the objects of the invention and to overcome the problems of the prior art, the self-threading casting bobber, according to the invention, includes a pair of separate shell sections having mating groove and bead structures formed on confronting circumferentially extending edge portions to allow a snap-fit attachment between the shells. Furthermore, the shape of the groove and bead ensure relative rotation of the shell sections as required.

Each shell section includes a fluid-tight air chamber formed by a sleeve portion extending inwardly from the shell and buoyancy plate mounted on the sleeve portion and attached to an inner surface of the respective shell. It is noted that the sleeves are aligned and open at either end to allow a locking shaft to be inserted completely through the attached shells. Also positioned between the separate fluid-tight chambers is an elongated spool assembly, including a disk-shaped support member having a central aperture to allow insertion of the locking shaft therethrough. The outer circumferential edge of the disk-shaped support member includes a pair of spaced reels formed by a dividing plate extending outwardly from an intermediate end portion of the disk-shape support member. A first aperture extends through one of the shell sections and a second aperture extends through the remaining shell section, with the apertures being alignable with a connecting passageway extending through the elongated spool between the spaced reels. Finally, the locking shaft also includes an aperture which is selectively alignable with the connecting passageway extending through the elongated spool.

To thread the bobber of the present invention, the apertures formed in each shell section and the aperture formed in the locking shaft are aligned with the passageway extending through the disk-shaped support shaft, allowing a predetermined length of fishing line to be threaded completely through the bobber. The locking shaft is then moved axially to clamp the fishing line between the locking shaft and a portion of the disk-shaped support member. It is also noted that the locking shaft and disk-shaped support member are attached for joint rotation with one another. By rotating one of the shells while preventing rotation of the remaining shell and attached locking shaft, the predetermined length of fishing line is caused to wrap about one reel of the spool. Once the bobber is cast into the water, the weight of the sinker will cause the fishing line to unwrap from the one reel, with a corresponding amount of fishing line simultaneously wrapping about the remaining reel. When it is desired to raise the sinker and hook, the fisherman draws the fishing line from the remaining reel, causing the one reel to again wrap with the predetermined length of fishing line. Finally, the sinker will contact the shell sections and further pulling of the fishing line functions to raise the bobber, sinker and hook from the water. Because the locking shaft is selectively engagable with one of the shell sections, it is possible to hold the locking shaft and attached shell section in one hand, while rotating the remaining shell section to initially wrap the fishing line about one of the reels formed on the spool disk.

BRIEF DESCRIPTION OF THE DRAWINGS

The present invention can be best understood with reference to the accompanying drawings, wherein:

FIG. 1 shows a perspective view of a preferred embodiment of the present invention;

FIG. 2 shows an exploded view of the components of the preferred embodiment of FIG. 1;

BEST MODE FOR CARRYING OUT THE INVENTION

Figure 3B:
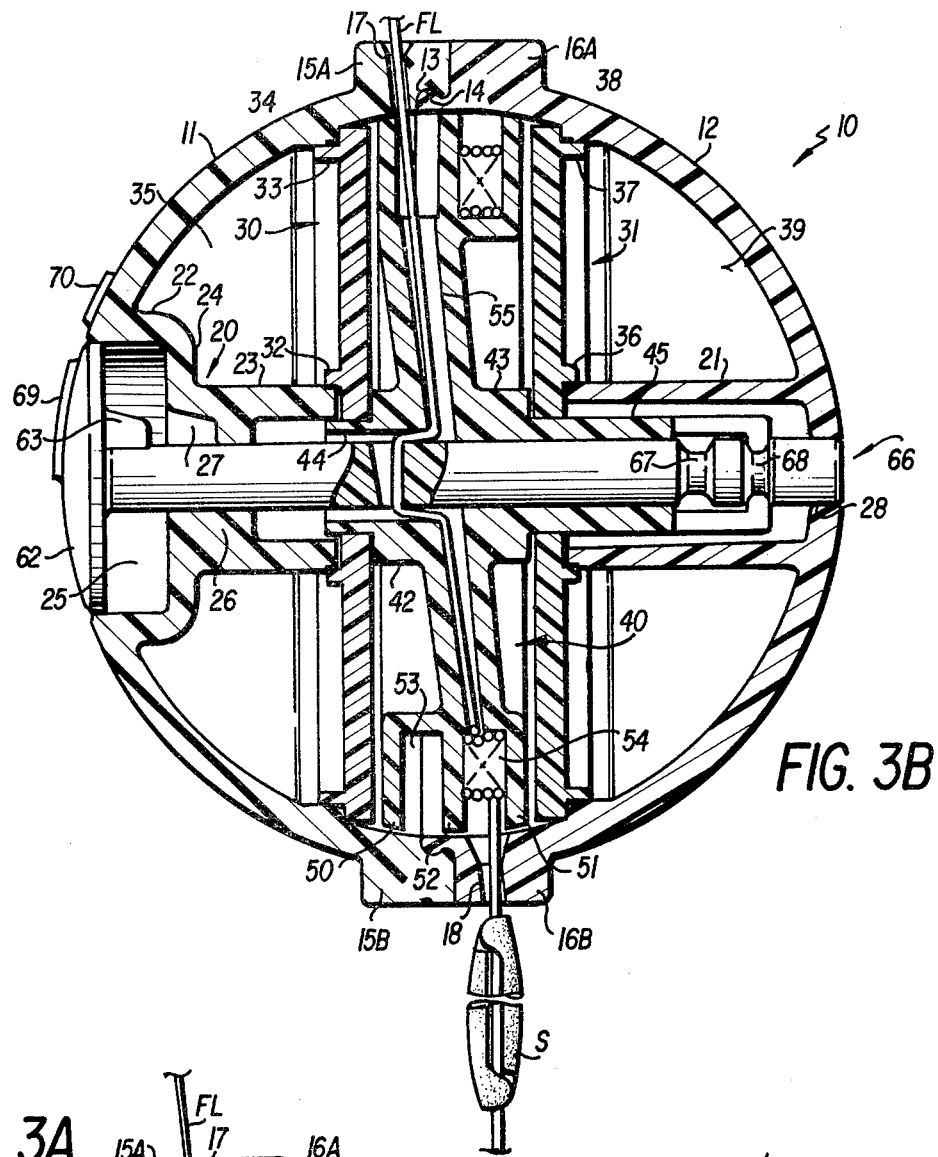
FIG. 3B shows a cross-sectional view similar to FIG. 3A after completion of the threading process.

The remaining portion of this specification will describe preferred embodiments of the present invention when read in conjunction with the attached drawings, in which like reference characters identify identical apparatus.

Referring to the drawings, and to FIG. 1 in particular, a buoyant, self-threading bobber assembly is generally designated at 10. Bobber 10 includes a pair of separate, hollow shell sections 11 and 12, respectively. Each of the shell sections 11 and 12 has a similar substantially hemispherical configuration and is formed of a rigid, synthetic resinous plastic such as polypropylene. Furthermore, each shell section 11 and 12 also includes a complementarily shaped, circumferentially extending edge portion as will be explained in detail hereafter. Finally, the shell sections 11 and 12 include openings positioned to allow a fishing line FL to extend completely through bobber 10.

Figure 3A:
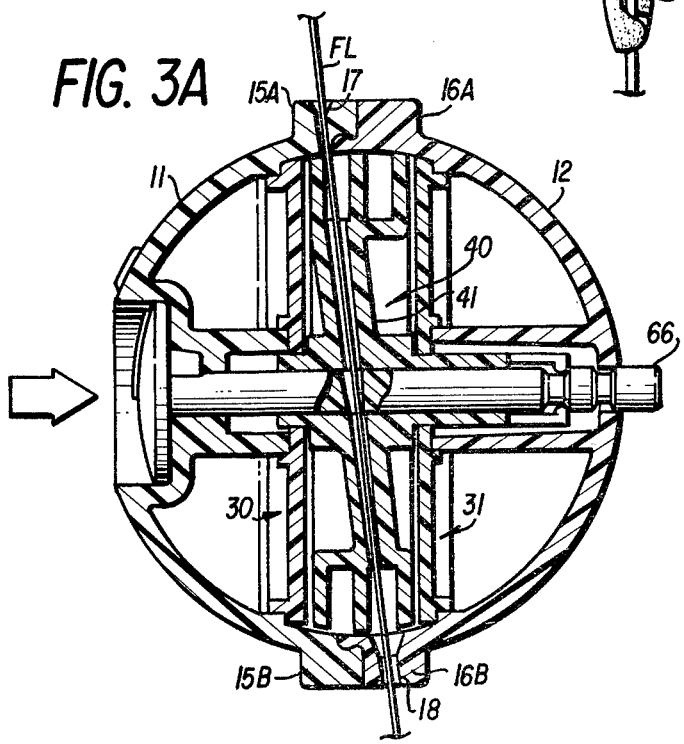
FIG. 3A shows a cross-sectional view taken through the section A—A of FIG. 1 during threading of the bobber assembly.

Turning now to FIGS. 3A and 3B, it is noted that the edge portion of the shell section 11 is formed with a groove 13 extending into a radially inner surface thereof. Likewise, the edge portion of shell section 12 is formed with a raised flange or bead portion 14 extending above a radially outer surface thereof. Groove 13 and bead 14 are formed with complementary shapes to allow insertion of bead 14 into groove 13 as shell sections 11 and 12 are pressed into engagement with one another, thereby creating a snap-fit between the edge portions of shell sections 11 and 12. The distinct advantage of the snap-fit created between shell sections 11 and 12 is that either of the sections may be selectively rotated while remaining in the engaged mode.

Shell section 11 further includes a pair of bosses 15A and 15B extending outwardly from opposite edge portions spaced substantially 180° apart. In a similar manner, shell section 12 also includes a pair of bosses 16A and 16B extending outwardly from opposite edge portions also spaced substantially 180° apart. As a result, when bosses 15A and 16A are positioned adjacent to one another, bosses 15B and 16B will also be positioned adjacent to one another. Each pair of bosses 15A, 15B and 16A, 16B are substantially similar in size and shape to one another. As shown in FIGS. 2, 3A and 3B, boss 15A includes an aperture 17 extending therethrough, with aperture 17 also extending through shell section 11. Likewise, an aperture 18 extends through boss 16B and shell section 12. Each of the apertures 17 and 18 share a common longitudinal axis when bosses 15A and 16A are aligned with one another to make insertion of fishing line FL through bobber 10 as easy as possible. In addition, each of the apertures 17 and 18 may be inclined to a longitudinal axis through its respective boss to further reduce the effort involved in threading fishing line FL therethrough. By positioning an aperture through each shell section 11 and 12, the fishing line FL, once inserted through bobber 10, will prevent either shell section 11 or 12 from being accidently dropped.

Each shell section 11 and 12 also includes a sleeve-shaped extension designated 20 and 21, respectively. In particular, sleeve-shaped extension 20 includes an end portion integrally engaging shell 11, while sleeve-shaped extension engages shell 12. Extension 20 includes a first end portion 22 and a second end portion 23, connected by an intermediate step portion 24. End portion 22 joins shell section 11 to form an enlarged opening 25 through shell section 11, while end portion 23 is formed with a somewhat smaller opening extending therethrough. Finally, a flange 26 extends inwardly from step portion 24 and second end portion 23, with flange 26 having a wedge-shaped notch 27 extending into a side facing opening 25.

Sleeve-shaped extension 21 also integrally joins shell section 12, with an opening 28 formed through a portion of shell section 12 being aligned with a center of extension 21. Furthermore, each of the sleeve-shaped extensions 20 and 21 are aligned with one another and are positioned substantially half-way between bosses 15A, 15B and 16A, 16B, respectively. It is noted from FIG. 3B that opening 28 has a diameter which is less than the diameter of sleeve-shaped extension 21.

A first disk or plate-shaped buoyancy member 30 is mounted within shell section 11, while a second disk or plate-shaped buoyancy member 31 is mounted within shell section 12. In particular, buoyancy member 30 includes a ring-shaped flange 32 extending outwardly from a side of buoyancy member 31 facing extension 20. Buoyancy member 30 is positioned such that an inner surface of ring-shaped flange 32 engages an outer surface of end portion 23 of extension 20. In a similar manner, buoyancy member 30 includes a further-ring shaped flange 33 extending parallel to and having a greater diameter than flange 32, with an outer surface of flange 33 contacting a boss 34 formed on an inner surface of shell section 11. Flange members 32 and 33 are conveniently fastened, as by ultrasonic welding, to sleeve-shaped extension 20 and boss 34, respectively. As a result, a fluid-tight chamber 35 is formed by buoyancy member 30, sleeve-shaped extension 20 and shell section 11.

Buoyancy member 31 also includes a pair of parallel extending, ring-shaped flanges 36 and 37, respectively, with flange 36 abutting an outer surface of sleeve extension 21 and flange 37 abutting a surface of a boss 38 extending inwardly from shell section 12. Flange portions 36 and 37 are fastened, as by ultrasonic welding, to sleeve 21 and boss 38, defining a further fluid-tight chamber 39 therebetween. It is noted that each of the plate-shaped buoyancy members 30 and 31 is formed with an opening extending through a central portion thereof, which openings are aligned with openings extending through sleeve-shaped extensions 20 and 21, respectively.

Figure 6:
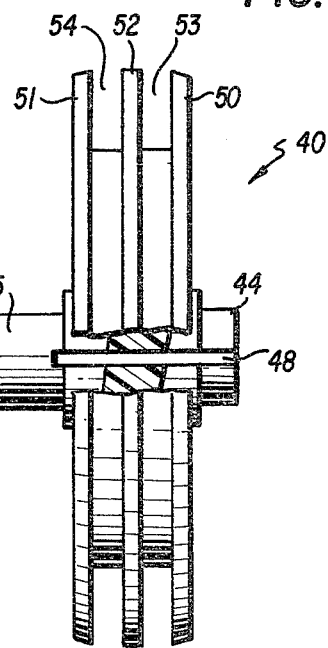
FIG. 6 shows a side view of the spool assembly of FIG. 3B.

An elongated spool assembly is generally designated at 40 in FIGS. 2, 3A, 3B and 6. Spool assembly 40 includes a disk-shaped support member 41 which is inclined relative to parallel extending buoyancy members 30 and 31, respectively. A pair of hollow hub members 42 and 43 extending outwardly from opposite sides of disk 41, with each of the hubs 42 and 43 aligned with openings formed in buoyancy members 30 and 31, respectively. In addition, an opening extends through disk 41 joining the openings in hub members 42 and 43 in a continuous passage through spool 40. Hub member 42 includes an end portion 44 of reduced diameter which extends through the opening formed in buoyancy member 30 and into the opening formed through sleeve-shaped extension 20. Similarly, hub 43 includes an end portion 45 of reduced diameter which extends through the opening in buoyancy member 31 and into sleeve 21. Furthermore, a pair of tongs 46A and 46B are attached to end portion 45, with each of the tongs including an inwardly directed flange portion 47A and 47B, respectively, as best shown in FIG. 6. Finally, a longitudinally extending slot 48 is formed in portions of hub 42, disk 41 and hub 43 for a purpose which will become clear hereafter.

Inclined support disk 41 includes a circumferentially extending outer surface having a pair of parallel extending end plates 50 and 51 attached to opposite sides thereof. Each of the end plates 50 and 51 extends into close proximity with inner surfaces of shell sections 11 and 12, respectively. In addition, a center dividing plate 52 extends from an intermediate portion of the outer edge surface of disk 41 into close proximity with the inner attached surfaces of shell sections 11 and 12. End plate 50 and dividing plate 52 combine with an outer edge portion of disk 41 to form first reel 53, while end plate 51 and dividing plate 52 combine with a further outer edge portion of disk 41 to form a second reel 54. Because reels 53 and 54 are formed on a single disk 41, they will both rotate as disk 41 rotates. Furthermore, dividing plate 52 is specifically constructed to extend toward shell sections 11 and 12 a sufficient distance to prevent fishing line FL from passing over plate 52 between reels 53 and 54, thereby preventing the fishing line from becoming entangled.

A connecting passageway 55 extends through disk 41 between portions of reels 53 and 54 positioned substantially 180° from one another. Connecting passageway 55 may also be inclined at substantially the same angle as apertures 17 and 18 to form an essentially straight line passage completely through bobber 10.

Figure 5:
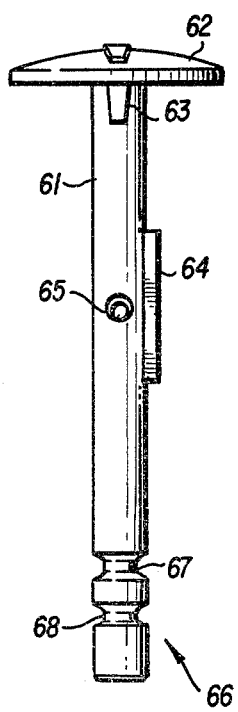
FIG. 5 shows a top view of the locking shaft of FIG. 3B.
Figure 7:
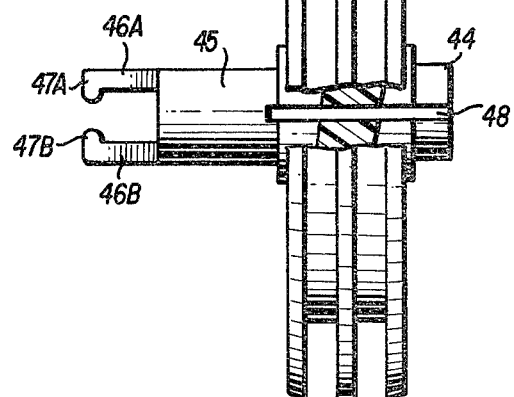
FIG. 7 shows a partial cross-sectional view of an attachment weld employed in the embodiment of FIG. 3B.
Figure 7:
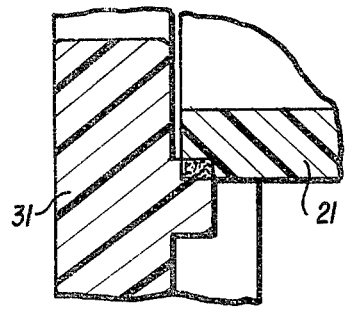

A locking member is generally designated at 60 in FIG. 5 and includes an elongated shaft portion 61 of substantially constant diameter. Mounted on end end of shaft 61 is an enlarged knob 62, extending substantially perpendicular to shaft 61. Knob 62 is substantially circular in shape and is formed with an outer diameter which corresponds to the size of opening 25 formed within end portion 22 of sleeve-shaped extension 20. In addition, a wedge member 63 is mounted on shaft 61 adjacent to knob 62, with wedge 63 having a shape substantially similar to the wedge-shaped notch 27 formed in flange 26 of sleeve 20. Shaft 61 further includes an elongated flange 64 extending longitudinally along an outer surface of shaft 61, with flange 64 having a configuration substantially corresponding to the configuration of slot 48. Shaft 61 further includes an aperture 65 extending transversely therethrough, with aperture 65 inclined an amount substantially similar to the inclination of apertures 17 and 18, as well as passageway 55. Finally, shaft 61 includes an end portion 66 positioned oppositely from knob 62, with a pair of axially spaced grooves 67 and 68 extending into end portion 66 a distance substantially equal to the length of flange members 47A and 47B, respectively. As noted in FIG. 1, an arrow shaped flange 69 is formed on knob 63, while a further arrow shaped flange 70 is formed directly on shell section 11. Furthermore, knob 63 may be serrated to allow for easy handling.

To assemble the present invention, spool assembly 40 is positioned adjacent to shell section 11 and the end portion 66 of locking member 60 is inserted through opening 25, sleeve 20 and disk 41 of spool 40. Care is taken to align and insert flange 64 into slot 48, thereby preventing relative rotation between shaft 61 and spool assembly 40. Next, shell section 12 is brought into engagement with shell section 11 as discussed herebefore, with shaft end 66 extending into opening 28 formed in shell 12.

The operation of the device will now be discussed in detail. An operator merely presses against and rotates knob 62 in either direction, until wedge 63 aligns with wedge-shaped notch 27. At this point, shaft 61 can slide into bobber 10. As shaft 61 moves inwardly, flange portions 47A and 47B will simultaneously rise out of groove 68, making a distinctive clicking sound which alerts the operator to the fact that locking mechanism 60 is properly aligned. Continued pressure against knob 62 functions to press wedge 63 into contact with notch 27, preventing further axial movement of shaft 61. At this point, flange portions 47A and 47B will drop into groove 67, while end portion 66 of shaft 61 will extend completely through opening 28. Furthermore, aperture 65 will remain aligned with passageway 55 due to the engagement between flange 64 on shaft 61 and slot 48 on spool 40. Finally, arrows 69 and 70 become aligned with one another, giving a visual indication to the operator that fishing line FL can now be inserted into bobber 10. In effect, bobber 10 has assumed that position shown in FIG. 3A, whereby fishing line FL can be easily passed through aligned aperture 17, passageway 55, aperture 64, passageway 55 and aperture 18.

Figure 4:
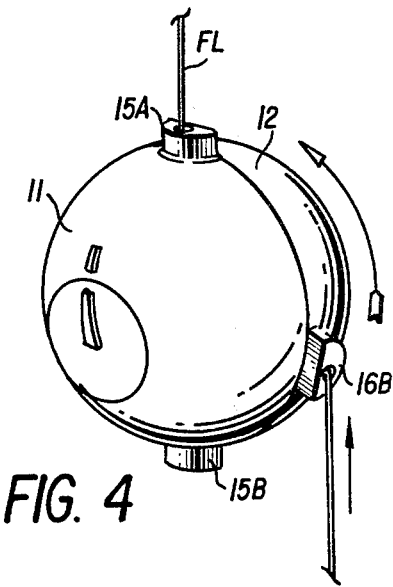
FIG. 4 shows a perspective view of the preferred embodiment during threading of the bobber assembly.

Once a predetermined length of fishing line FL has been passed through bobber 10, end portion 66 of shaft 61 is pressed toward shell section 12. This causes flange portions 47A and 47B to ride out of groove 67 and drop once again into groove 68. As a result, a quantity of fishing line FL extending between passageway 55 and aperture 64 will be axially moved toward shell section 11 as shown in FIG. 3B. This, in turn, results in fishing line FL becoming fixedly clamped between an outer surface of shaft 61 and an inner surface of hub member 42. At this point, shell section 11 is maintained in a fixed position by the operator, while shell section 12 is rotated in a counter-clockwise direction as shown in FIG. 4.

Figure 8A:
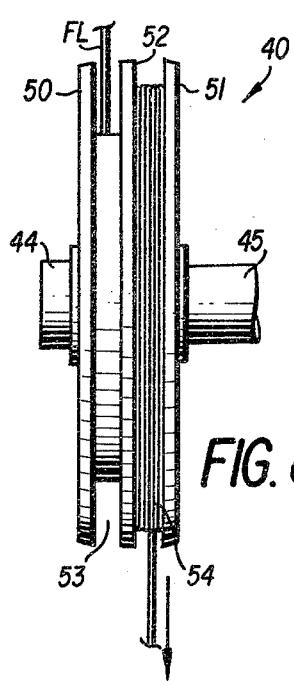
FIGS. 8A and 8B show side views of the spool assembly upon impact of the bobber with the water and when the sinker has reached final depth, respectively.
Figure 8B:
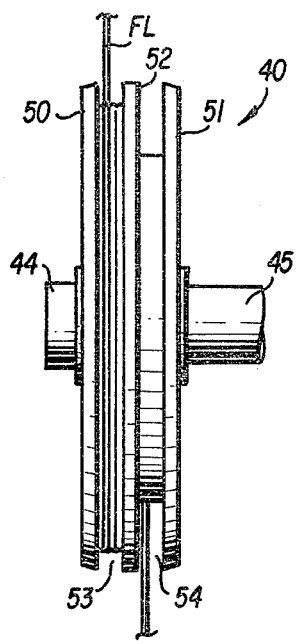

Counter-clockwise rotation of shell section 12 is easily accomplished by grasping and appropriately twisting boss members 16A and 16B about an axis extending parallel to shaft 61. Because shaft 61 and spool 40 fixedly clamp a portion of the fishing line FL therebetween, counter-clockwise rotation of shell section results in spool 40 and shaft 61 also being forced to rotate in a counter-clockwise direction by the predetermined portion of the fishing line extending through aperture 18. As a result, fishing line FL is wound onto reel 54 until sinker S assumes the position shown in FIG. 3A and the fishing line assumes the position shown in FIG. 8A. Bobber 10 is now ready for casting into the water. While it has been stated that counter-clockwise rotation of shell section 12 will result in the wrapping of fishing line FL onto reel 54, it is, of course, inherent from the structure of bobber assembly 10 that clockwise rotation of shell section 12 will also result in the wrapping of fishing line FL onto reel 54.

As bobber 10 impacts against the water, the weight of sinker S functions to drag the baited hook, not shown, beneath the water. As a result, spool 40 now rotates in an opposite or clockwise direction until the amount of fishing line wrapped about reel 54 is entirely let out. At this point, the sinker and baited hook achieve a predetermined depth beneath the floating bobber assembly 10.

Because the spool 40 has been forced to rotate in a clockwise direction by the movement of sinker S, an additional quantity of fishing line is pulled through aperture 17 and is wrapped about reel 53, with the additional quantity being identical to the predetermined length extending between bobber 10 and sinker S.

To raise sinker S, a fisherman merely draws or reels in the fishing line, causing a counter-clockwise rotation of spool 40 as the fishing line FL is drawn from reel 53 through aperture 17. The counter-clockwise rotation of spool 40 simultaneously functions to once again wrap the predetermined length of fishing line about reel 54, thus raising sinker S toward bobber 10. When sinker S physically contacts bobber 10, additional rotation of spool 40 becomes impossible. As a result, the entire bobber 10 and sinker S are withdrawn from the water upon further reeling in of the fishing line FL.

When it is desired to alter the predetermined depth of sinker S and the baited hook, it is merely necessary to once again press and rotate knob 62 until wedge 63 is aligned with notch 27. This allows shaft 61 to move through spool 40, freeing the fishing line FL extending therebetween. After the fishing line initially wrapped on spool 40 has been unwound and withdrawn through aperture 17, a new predetermined length is then drawn through apertures 17 and 18, and the end portion 66 is pressed to once again clamp the fishing line FL between shaft 61 and hub 42.

The present invention provides a maximum amount of floatation due to the enlarged, fluid-tight chambers 35 and 39 made possible by the reduced axial size of spool 40 as compared to prior art assemblies. Furthermore, sleeve-shaped extension members 20 and 21 combine with buoyancy members 30 and 31 to provide maximum rigidity for bobber 10, while at the same time, employing a minimum amount of material in the construction of bobber 10.

While shell sections 11 and 12 have been shown as substantially hemispherical in shape, the sections are not intended to be limited to such shapes, but, may be formed of any convenient configuration such as oblong or pear. Likewise, shell section 12 may include a wedge-shaped notch for engaging an end of locking member 60, with shell section 11 being alternatively rotated to wrap the fishing line FL about spool 40.

The present invention is not to be limited to the above-described embodiments, but is to be limited only by the scope of the following claims.

I claim:

1. A self-threading bobber assembly for automatically letting out a predetermined length of fishing line in order to position a sinker attached to the line a predetermined depth beneath the bobber following impact of the bobber and sinker into a body of water, and comprising:
   a pair of hollow shell sections formed with edge portions having substantially similar configurations, with a separate aperture extending through each shell section adjacent said respective edge portion to allow fishing line to pass through said bobber;
   fastening means for releasably joining said edge portions to one another to form a closed chamber, while allowing rotation of either shell section relative to the remaining shell section;
   at least one fluid-tight chamber mounted within said closed chamber formed by said attached shell sections for maintaining said bobber on the surface of said body of water following impact;
   a spool assembly rotatably mounted within said closed chamber and including a disk-shaped support member extending substantially the entire distance through said chamber;
   a pair of spaced reel means formed on an outer edge of said disk-shaped support member for supporting a quantity of fishing line wrapped thereabout;
   connecting passageway means extending in a straight line through said disk-shaped support member for providing a passageway between said spaced reel means, allowing fishing line to pass therebetween; and
   locking means selectively blocking said connecting passageway means to fixedly attach said fishing line to said spool assembly, forcing said fishing line to wrap about one of said spaced reel means responsive to rotation of one of said shell sections.

2. A self-threading bobber according to claim 1, wherein each of said hollow shell sections has a substantially hemispherical configuration.

3. A self-threading bobber according to claim 1, wherein a pair of bosses extend outwardly from each shell section, with each pair of bosses spaced substantially 180° apart and positioned adjacent the respective edge portion of said shell section.

4. A shelf-threading bobber according to claim 3, wherein one of the bosses mounted on each shell section has an aperture extending therethrough, which aperture is aligned with said aperture extending through said respective shell section.

5. A self-threading bobber according to claim 1, wherein said fastening means comprises a groove formed in an edge portion of one of said shell sections and a raised bead formed in an edge portion of the remaining shell section, with said groove and bead having complementary cross-sectional configurations to allow said bead to enter said groove as said edge portions are pressed into engagement with one another.

6. A self-threading bobber according to claim 1, wherein said fluid-tight chamber having an area defined by a sleeve member attached to and extending inwardly from an inner surface of one of said shell sections, a disk member extending between and attached to said sleeve member and a further portion of said inner shell surface and said respective inner shell surface extending between said sleeve member and said disk member.

7. A self-threading bobber according to claim 6, wherein a separate fluid-tight chamber is formed within each shell section, with each chamber having an area defined by a separate sleeve member attached and extending inwardly from an inner surface of each of said shell sections, a separate disk member extending between and attached to one of said sleeve members and a further inner wall surface of said respective shell section including said sleeve member, and said respective inner shell surface extending between said sleeve and said disk.

8. A self-threading bobber according to claim 7, wherein each shell section includes a further aperture extending through a wall portion coinciding with said attached sleeve member to form a further passageway through said attached shell sections.

9. A self-threading bobber according to claim 8, wherein said spool assembly includes an opening extending through a central portion, which opening is aligned with said pair of sleeve members and said pair of further apertures formed through said shell sections.

10. A self-threading bobber according to claim 9, wherein said locking means comprises a shaft member extending through said aligned sleeve members and said spool assembly, said shaft member including a transverse aperture selectively alignable with said passageway means formed through said disk-shaped member.

11. A self-threading bobber according to claim 10, wherein said locking means further comprises a wedge-shaped member mounted on said shaft and a corresponding wedge shaped notch formed in one of said sleeve members, with said shaft being rotatable to align said wedge with said notch, thereby allowing insertion of said shaft through said closed chamber until said transverse aperture in said shaft is aligned with said passageway means extending through said disk-shaped member.

12. A self-threading bobber according to claim 10, wherein said shaft includes a pair of spaced grooves selectively engaging a pair of flanges attached to an end portion of said spool assembly to indicate the axial movement of said shaft.

13. A self-threading bobber according to claim 11, wherein a knob is attached to said shaft adjacent to said wedge-shaped member.

14. A self-threading bobber according to claim 1, wherein each of said reel means comprises a separate end plate and a common dividing plate extending outwardly from the outer edge of said disk-shaped support member, with each of said end plates and said dividing plate having an end surface positioned adjacent to said attached shell section to prevent said fishing line from jumping either end plate or said common dividing plate.

15. A self-threading bobber according to claim 14, wherein said connecting passageway means comprises a connecting passageway inclined to a vertical axis extending through said bobber and extending between each of said reels and a central aperture formed through said disk-shaped support member.

16. A self-threading bobber according to claim 7, wherein each disk member extending between a respective sleeve member and inner shell section is formed with a pair of concentrically positioned ring-shaped flange members, with one of said ring-shaped flange members engaging an abutting surface of said respective sleeve member and the remaining ring-shaped flange engaging a boss formed on the respective inner shell section, with the ring-shaped flanges ultrasonically welded to said abutting sleeve and shell surfaces, respectively.

17. In a self-threading, hollow bobber assembly of the type including a spool assembly rotatably mounted within a shell assembly, with inlet and outlet apertures formed through said shell assembly alignable with a connecting passageway formed through said spool assembly, allowing easy movement of fishing line completely through said bobber assembly without separation of said shell assembly;

said improvement comprising:
locking means axially slidably supported within an opening extending through said spool assembly for selectively biasing said fishing line into contact with said spool assembly to prevent movement of said fishing line through said bobber assembly.

18. A self-threading hollow bobber assembly according to claim 17, wherein said locking means comprises a shaft member extending through said spool assembly, said shaft including a transverse aperture selectively alignable with said connecting passageway to form a continuous passageway through said spool assembly to allow movement of said fishing line through said hollow bobber assembly.

19. A self-threading hollow bobber assembly according to claim 18, wherein said shaft member further includes a pair of grooves formed in an outer surface thereof, with said grooves being spaced from one another and selectively alignable with a pair of flanges attached to said spool assembly to limit axial movement of said shaft member.

20. A self-threading fishing bobber assembly for storing a variable quantity of fishing line and the like, and comprising:

first and second hollow shell sections having edge portions complementary in configuration to one another;
complementary fastening means formed on said edge portions for rotatably attaching said first and second shell sections to one another, defining at least one closed chamber therebetween;
a separate aperture extending completely through each of said first and second shell sections, allowing fishing line to pass completely through said attached shell sections;
spool assembly means rotatably mounted within said at least one closed chamber for storing a quantity of said fishing line wrapped thereabout; and
locking means supported on said spool assembly means for selectively biasing a portion of said fishing line into non-slip contact with said spool assembly means, forcing said fishing line to wrap about said spool assembly means responsive to rotation of said first shell section in a first direction relative to said attached second shell section, and forcing said fishing line to unwrap from said spool assembly means responsive to rotation of said first shell section in a second, opposite direction relative to said attached second shell section.

21. A self-threading hollow bobber assembly according to claim 20, wherein said fastening means comprises a groove formed in an edge portion of one of said shell sections and a raised bead formed in an edge portion of a further shell section, said groove and bead having complementary cross-sectional configurations to allow said bead to enter said groove as said edge portions are pressed into mutual engagement with one another.

22. A self-threading bobber assembly according to claim 20, wherein said locking means comprises a shaft member extending through an opening extending longitudinally through said spool assembly means, said shaft including a transverse aperture selectively alignable with a connecting passage extending through said spool assembly means, thereby forming a continuous passageway through said spool assembly means to allow sliding movement of said fishing line through said spool assembly means as well as said shaft member extending therethrough.

* * * * *